United States Patent
Werries et al.

(10) Patent No.: US 12,138,981 B2
(45) Date of Patent: Nov. 12, 2024

(54) CENTRAL JOINT DEVICE FOR CHASSIS COMPONENTS

(71) Applicant: ZF Friedrichshafen AG, Friedrichshafen (DE)

(72) Inventors: Christoph Werries, Bissendorf (DE); Sören Knopp, Ostercappeln (DE); Julian Stratmann, Bad Essen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/019,131

(22) PCT Filed: Jul. 29, 2021

(86) PCT No.: PCT/EP2021/071294
§ 371 (c)(1),
(2) Date: Feb. 1, 2023

(87) PCT Pub. No.: WO2022/042996
PCT Pub. Date: Mar. 3, 2022

(65) Prior Publication Data
US 2023/0271472 A1    Aug. 31, 2023

(30) Foreign Application Priority Data
Aug. 31, 2020 (DE) ............... 10 2020 210 979.6

(51) Int. Cl.
*B60G 17/0185* (2006.01)
*B60G 17/019* (2006.01)
*F16C 11/06* (2006.01)

(52) U.S. Cl.
CPC ... *B60G 17/0185* (2013.01); *B60G 17/01908* (2013.01); *F16C 11/0647* (2013.01);
(Continued)

(58) Field of Classification Search
CPC ............... B60G 2204/1162; F16C 11/0647
See application file for complete search history.

(56) References Cited

U.S. PATENT DOCUMENTS

| 2009/0136288 A1* | 5/2009 | Ersoy | B60D 1/58 702/34 |
| 2020/0307333 A1* | 10/2020 | Reddehase | B60G 7/02 |

FOREIGN PATENT DOCUMENTS

| DE | 101 10 738 | 11/2002 |
| DE | 10 2005 027 826 | 1/2007 |

(Continued)

OTHER PUBLICATIONS

Stratmann et al. DE 10 2015 220755 English Machine translation, ip.com (Year: 2017).*

(Continued)

*Primary Examiner* — Karen Beck
(74) *Attorney, Agent, or Firm* — Cozen O'Connor (57) ABSTRACT

A central joint device for chassis components (2), particularly three-point link, is suggested. The central joint device comprises at least one housing unit (3), at least one joint pin unit (4) which is movably supported at least partially inside of the housing unit (3), and at least one sensor unit (5), particularly a magnetic sensor unit, which is provided for contactless detection of roll motions and pitch motions of the housing unit (3) and of the joint pin unit (4) relative to one another. The sensor unit (5) comprises at least one encoder element (6) and at least one sensor element (7). The encoder element (6) and the sensor element (7) are arranged to be spaced apart from one another and movable relative to one another.

19 Claims, 5 Drawing Sheets

(52) U.S. Cl.
CPC .. *B60G 2204/116* (2013.01); *B60G 2400/051* (2013.01); *F16C 2233/00* (2013.01); *F16C 2326/05* (2013.01)

(56) References Cited

FOREIGN PATENT DOCUMENTS

| | | | |
|---|---|---|---|
| DE | 102007008155 A1 * | 8/2008 | ............. G01D 5/145 |
| DE | 10 2008 041050 | 2/2010 | |
| DE | 10 2012 223609 | 6/2014 | |
| DE | 10 2015 220755 | 4/2017 | |
| DE | 10 2016 215 416 | 2/2018 | |
| DE | 102016215416 A1 * | 2/2018 | |
| JP | 62-132020 | 6/1987 | |
| WO | WO 03/008819 | 1/2003 | |
| WO | WO 2005/021295 | 3/2005 | |
| WO | WO 2007/009419 | 1/2007 | |

OTHER PUBLICATIONS

Holtheide et al. DE 10 2016 215416 English Machine Translation, ip.com (Year: 2016).*
Office Action dated May 13, 2024 issued in European Patent Application No. 21 749 651.2.

* cited by examiner

CENTRAL JOINT DEVICE FOR CHASSIS COMPONENTS

PRIORITY CLAIM

This is a U.S. national stage of application No. PCT/EP2021/071294, filed on Jul. 29, 2022. Priority is claimed on German Application No.: 10 2020 210 979.6, filed Aug. 31, 2020, the content of which is incorporated here by reference.

BACKGROUND OF THE INVENTION

The invention is directed to a central joint device for chassis components, particularly three-point links. The invention is further directed to a chassis component, in particular a three-point link, and to a vehicle, particularly a utility vehicle. The invention is additionally also directed to a computer-implemented process for operating a central joint device and to a corresponding computer program product.

Joints having a sensor device are known from the prior art. For example, German Patent Application DE 10 2016 215 416 A1 describes a sensor device for ball joints in which an encoder and a sensor are in constant contact with one another. German Patent DE 10 2005 027 826 B3 describes a ball joint having a sensor for permanent determination of a wear state of the ball joint.

SUMMARY OF THE INVENTION

A central joint device for chassis components, particularly three-point links, is suggested. The central joint device comprises at least one housing unit. The central joint device comprises at least one joint pin unit which is movably supported at least partially inside of the housing unit. The central joint device comprises at least one sensor unit, particularly a magnetic sensor unit, which is provided for contactless detection of roll motions and pitch motions of the housing unit and of the joint pin unit relative to one another. The sensor unit comprises at least one encoder element. The sensor unit comprises at least one sensor element. The encoder element and the sensor element are arranged to be spaced apart from one another and movable relative to one another.

The central joint device is preferably at least partially formed as a central joint, in particular as a ball joint. In particular, a chassis component of a vehicle, particularly of a utility vehicle, can comprise the central joint device. The chassis component is preferably formed as a three-point link, in particular for stabilization of a utility vehicle.

However, the chassis component can also be constructed differently from a three-point link, for example, as a control arm. An individual chassis component of the vehicle preferably has an individual central joint device according to the invention. Alternatively, it is contemplated that the vehicle has a plurality of chassis components having the central joint device according to the invention and/or that the chassis component has a plurality of central joint devices according to the invention. By "provided" is meant in particular specifically programmed, specifically outfitted and/or specifically configured. Providing an object for a function shall be understood to mean particularly that the object carries out the function in at least one operating state.

The housing unit is preferably rigidly connectable to further component parts of the chassis component, for example, fastening bars of a three-point link for fastening to a vehicle frame. The joint pin unit is preferably connectable to further component parts of the vehicle, particularly further chassis components. The joint pin unit is preferably rigidly connectable to a vehicle axle, particularly a rear axle, of the vehicle.

The joint pin unit, particularly a joint ball of the joint pin unit, is preferably rotatably and tiltably supported at least partially inside of the housing unit. In particular, the joint pin unit and the housing unit are movable relative to one another. The housing unit and the joint pin unit can move relative to one another in particular depending on movements of the vehicle, particularly depending on roll movements and/or pitch movements of the vehicle. The chassis component comprising the central joint device preferably serves at least partially for stabilizing the vehicle during driving operation.

The sensor unit is preferably formed as a magnetic sensor unit. Alternatively or in addition, it is contemplated that the sensor unit is formed as an optical sensor unit, as a capacitive sensor unit, as an inductive sensor unit, or as another sensor unit deemed useful by a person skilled in the art.

The sensor unit is preferably integrated at least partially in the housing unit and at least partially in the joint pin unit. In particular, one of the elements of the sensor unit is arranged at the housing unit and another element is arranged at the joint pin unit. In particular, a relative movement between the housing unit and the joint pin unit corresponds to a relative movement between the encoder element and the sensor element. There is preferably no contact between the encoder element and the sensor element in any possible relative orientation, in particular in order to realize minimized wear.

The encoder element is preferably formed as a magnet, particularly as a permanent magnet. The encoder element is preferably provided for generating a magnetic field. The sensor element is preferably provided for detecting the magnetic field generated by the encoder element. The sensor element is preferably formed as a magnetic field sensor, particularly as a Hall sensor. The sensor unit is preferably provided for detecting movements, particularly roll motion and pitch motion, of the housing unit and of the joint pin unit relative to one another depending on changes in the magnetic field at the position of the sensor element. In particular, the sensor unit, particularly the sensor element, comprises at least one electronics, particularly an integrated circuit, in order to detect movements, particularly roll motion and pitch motion, of the housing unit and of the joint pin unit relative to one another depending on magnetic field changes. Alternatively or additionally, it is conceivable that the sensor unit is communicatively coupled to a computing device, for example, a control device, of the vehicle. In particular, the computing device can be provided for evaluating data acquired by the sensor element. A control device provides data of sensors as input signals, processes them, for example, by means of a programmable logic module, an FPGA module or ASIC module, or a computer platform, and provides logic level and/or level power as a control signal or adjustment signal. The control device and the sensor unit are preferably integrated in an on-board power supply of the vehicle, for example, in a CAN bus.

Roll motion and pitch motion of the housing unit and of the joint pin unit relative to one another are, in particular, tilting movements of the housing unit and of the joint pin unit relative to one another around two different axes, particularly axes perpendicular to one another. A roll motion of the housing unit and of the joint pin unit relative to one another is preferably a tilting movement of the housing unit and of the joint pin unit relative to one another around a longitudinal axis of the vehicle. A pitch motion of the housing unit and of the joint pin unit relative to one another is preferably a tilting movement of the housing unit and of the joint pin unit relative to one another around a transverse vehicle axis. Alternatively, roll motion and pitch motion of the housing unit and of the joint pin unit relative to one another can also be carried out around different axes than the longitudinal axis of the vehicle and/or transverse axis of the vehicle. The transverse axis of the vehicle preferably extends perpendicular to the longitudinal axis of the vehicle. The sensor unit is preferably provided for simultaneously detecting relative movements of the housing unit and of the joint pin unit around two axes. In particular, the sensor unit is provided for simultaneously detecting a roll motion and a pitch motion of the housing unit and of the joint pin unit relative to one another. In particular, a roll motion of the housing unit and of the joint pin unit relative to one another is dependent on a roll motion of the vehicle comprising the central joint device. In particular, a pitch motion of the housing unit and of the joint pin unit relative to one another is dependent on a pitch motion of the vehicle comprising the central joint device. Preferably, a roll motion and/or pitch motion of the vehicle can be deduced depending on a detected roll motion and/or pitch motion of the housing unit and of the joint pin unit relative to one another. Data provided by the sensor unit can preferably be utilized for controlling vehicle functions, for example, a ride height control, a roll stabilization, steering assistance, or the like.

The inventive configuration of the central joint device can advantageously enable a detection of roll motions and pitch motions. Additional sensors, for example, level sensors, can advantageously be dispensed with. Wear and/or a separation of the central joint device can be reliably detected in an advantageous manner. A central joint device can be provided which advantageously enables comfortable and safe operation for the user.

It is further suggested that the sensor element be arranged at the housing unit, particularly at at least one cover element of the housing unit, and that the encoder element be arranged at the joint pin unit, or the sensor element is arranged at the joint pin unit and the encoder element is arranged at the housing unit, in particular at the cover element. The sensor element is preferably arranged at the housing unit, in particular at least partially inside of the housing unit, and the encoder element is preferably arranged at the joint pin unit, particularly at the joint ball. In case the sensor element is arranged at the joint pin unit, the joint pin unit preferably has at least one line channel through which at least one line, particularly a cable, can be guided for power transmission and data transmission of the sensor elements. The encoder element and the sensor element are preferably fixed in a stationary manner at the housing unit and joint pin unit. The encoder element or the sensor element is preferably arranged, particularly at least in a deflection-free position of the central joint device, at the joint ball, particularly on a side of the joint ball remote of a fastening area of the joint pin unit for fastening to a further chassis component. By "deflection-free position" of the central joint device is meant particularly a relative position of the housing unit and of the joint pin unit with respect to one on another in a state in which no forces act on the central joint device, for example, through roll motions of a vehicle. In the deflection-free position of the central joint device, a longitudinal axis, particularly a rotational axis, of the central joint device, particularly of the joint pin unit, preferably extends through the center of the encoder element and/or the sensor element. In the deflection-free position of the central joint device, the longitudinal axis, particularly the rotational axis, of the central joint device, particularly of the joint pin unit, preferably extends perpendicularly through a main extension plane of the encoder element and/or of the sensor element. By "main extension plane" of an object is meant in particular a plane which is parallel to a largest side of a smallest notional rectangular cuboid that still fully encloses the object and, in particular, runs through the center point of the cuboid. A relative movement of the encoder element and of the sensor element with respect to one another can advantageously be made possible depending on a relative movement of the housing unit and of the joint pin unit with respect to one another. The encoder element and the sensor element can advantageously be arranged so as not to contact one another and wear can be minimized.

It is further suggested that the sensor unit be formed as a tilt angle sensor unit and/or rotational angle sensor unit. In particular, the sensor element is formed as a tilt angle sensor and/or rotational angle sensor. The sensor unit, particularly the sensor element, is advantageously provided to detect at least one tilt angle and/or at least one rotational angle between the housing unit and the joint pin unit. The sensor unit, particularly the sensor element, is preferably provided to detect relative tilting of the housing unit around a center point of the joint ball. The sensor unit, particularly the sensor element, is preferably provided to simultaneously detect relative tilt around two tilt axes. The sensor unit, particularly the sensor element, is advantageously provided to detect tilting of the housing unit and of the joint pin unit relative to one another, particularly around the longitudinal axis of the central joint device. In particular, roll motion and/or pitch motion can be determined depending on the tilt angle and/or rotational angle.

It is further suggested that the sensor unit be provided to detect vibrations of component parts, particularly microvibrations, in order to determine wear. In particular, the sensor unit is provided for determining a wear state of the central joint device and/or wear data for determining the wear state of the central joint device by means of a computing device. In particular, structural component parts of the central joint device, particularly the housing unit and the joint pin unit, have vibrations, particularly with a determined resonant frequency. In particular, the vibrations influence a magnetic field signal, for example, in the form of harmonics, detected by the sensor unit. In particular, the vibrations, particularly the resonant frequencies, can change as a result of wear, for example, abrasion, at a component part, particularly can shift frequency. The sensor unit and/or the computing device are/is provided to determine a wear state of the component parts depending on a change in the component vibrations, particularly the microvibrations. The sensor unit can advantageously perform an additional function. A precise wear determination and a high level of user-safety can be made possible in an advantageous manner.

It is further suggested that the sensor unit be provided for detecting a separation between the housing unit and the joint pin unit and/or between a cover element, particularly the aforementioned cover element, of the housing unit and at least one base body of the housing unit. The sensor unit is preferably provided for detecting a separation depending on a change in the magnetic field signal. The joint pin unit, particularly the joint ball, is preferably arranged at least partially inside of the base body of the housing unit. The cover element is provided particularly to seal the base body against penetration of foreign bodies which can increase wear. In particular, a separation between the housing unit and the joint pin unit may present an intermediate risk for a passenger of the vehicle because, in this case, the central joint device can no longer perform its function. In particular, a separation between the cover element and the base body presents at least an indirect risk for the occupant of the vehicle because, in this case, foreign bodies can penetrate the central joint device and increase and accelerate wear. The sensor element or the encoder element is preferably arranged at the cover element for detecting a separation between the cover element and the base body. The sensor unit can advantageously perform a further additional function, and a particularly user-safe central joint device can be provided.

It is further suggested that the sensor unit be provided to detect the separation depending on a limit distance between the encoder element and the sensor element being exceeded. In particular, exceeding the limit distance between the encoder element and the sensor element corresponds to falling below a limit value of the magnetic field signal. The limit distance can be, for example, a distance which is greater than a maximum distance between the encoder element and the sensor element during a maximum deflection in a non-separated state of the central joint device. A reliable detection of a separation can advantageously be made possible.

It is further suggested that the sensor unit be configured to provide an early detection of separation depending on sensor signal harmonics, particularly angle signal harmonics. In particular, a play in a bearing support of the joint pin unit at the housing unit may indicate an imminent separation. In particular, during a forward movement of the vehicle with the central joint device, the play in the bearing support can be detected based on the sensor signal harmonics depending on high-frequency excitations due to a roadway. In particular, the sensor signal harmonics are harmonics on the magnetic field signal detected by the sensor unit, particularly by the sensor element. The sensor unit can advantageously perform a further additional function and a particularly user-comfortable central joint device can be provided.

Further, a chassis component, particularly a three-point link, comprising at least one central joint device according to the invention is suggested. The chassis component can preferably comprise further component parts deemed as useful by a person skilled in the art, for example, fastening bars and/or molecular joints. A multi-functional chassis component can advantageously be provided.

Further, a vehicle, particularly a utility vehicle, comprising at least one central joint device according to the invention and/or at least one chassis component according to the invention is suggested. The vehicle is preferably formed as a land vehicle. The vehicle can be formed particularly as a truck, a construction site vehicle, a bus, or other vehicle deemed useful by a person skilled in the art. A user-safe and user-comfortable vehicle can advantageously be provided.

Further, a computer-implemented process for operating a central joint device according to the invention is suggested. Sensor signals of the sensor unit are evaluated in at least one process step for determining at least one function value of the central joint device, particularly a wear state and/or a separation state and/or a vehicle state, particularly a ride height and/or a steering angle. The sensor signals are preferably evaluated by the sensor unit, particularly by the electronics of the sensor unit, and/or by the computing device, for example, of the vehicle with the central joint device.

In particular, an axle position of the vehicle can be completely determined depending on the sensor signals of the individual sensor unit of the central joint device. In particular, two degrees of freedom of the central joint device, particularly roll motion and pitch motion, are monitored by means of the sensor unit. Ride heights can preferably be determined by means of an algorithm which can be executed particularly by the sensor unit and/or by the computing device. In particular, a combination of a mechanical roll angle and pitch angle is associated with each combination of a magnetic field angle in roll direction and pitch direction. In particular, the combination of the mechanical roll angle and pitch angle can be determined depending on the combination of the magnetic field angle in roll direction and pitch direction. Mathematically, this is particularly a matter of a coupled multivariable system having two inputs and two outputs. The mechanical roll angle and/or the mechanical pitch angle can preferably be determined analytically, particularly via two equations with two unknowns in each instance, approximately, particularly via a characteristic diagram, via classification, particularly by means of artificial intelligence and/or a supervised learning algorithm or in some other manner deemed useful by a person skilled in the art. In particular, the function value of the central joint device and/or the vehicle state can be determined depending on the combination of the mechanical roll angle and pitch angle. Information contributing to user safety and user comfort can advantageously be determined.

Further, in at least one process step, at least one occupant of the vehicle, particularly a vehicle driver, is provided with at least one informatory signal, particularly a warning signal, depending on the evaluation of the sensor signals. The occupant of the vehicle is preferably provided with an optical, acoustic and/or haptic informatory signal. An optical informatory signal can be, for example, a blinking of a warning light, a warning message on a screen or in a head-up display, or the like. An acoustic informatory signal can be, for example, a signal tone, a warning announcement, or the like. A haptic informatory signal can be, for example, a vibration of a steering wheel, a tightening of a seatbelt, or the like. The occupant of the vehicle can advantageously be comfortably informed about a state of the central joint device. Manual countermeasures can advantageously be initiated.

Further, at least one control signal or adjustment signal is determined for a vehicle control device in at least one process step depending on the evaluation of the sensor signals. The control signal or adjustment signal is preferably determined by the sensor unit and/or by the computing device of the vehicle. The control signal or adjustment signal is preferably provided to the vehicle control device. The vehicle control device is preferably provided to control a forward movement, particularly a driving operation, of the vehicle at least partially, particularly at least semiautomatically. In particular, the vehicle control device can comprise actuators for longitudinal and/or transverse guiding of the vehicle. In particular, the actuators are controllable by means of the determined control signal or adjustment signal. An actuator for transverse guidance can be formed, for example, as an electric motor of an electromechanical power steering. At least one action is carried out or initiated, for example, an emergency braking, an electronic vehicle stabilization, a damper control, or the like, particularly by the vehicle control device depending on the control signal or adjustment signal. An automated safety function/comfort function can advantageously be provided. Safety and comfort of occupants of the vehicles can advantageously be increased.

Further, a computer program product is suggested. The computer program product comprises execute commands which, during the execution of the program by a computing device, for example, the electronics of the sensor unit or the computing device of the vehicle, cause the latter to execute a process according to the invention. A computer program product can advantageously be provided for a user-comfortable and user-safe operation of a central joint device.

BRIEF DESCRIPTION OF THE DRAWINGS

The invention will be illustrated referring to an exemplary embodiment in the following figures. The drawings show.

DETAILED DESCRIPTION OF THE PRESENTLY PREFERRED EMBODIMENTS

Figure 1:
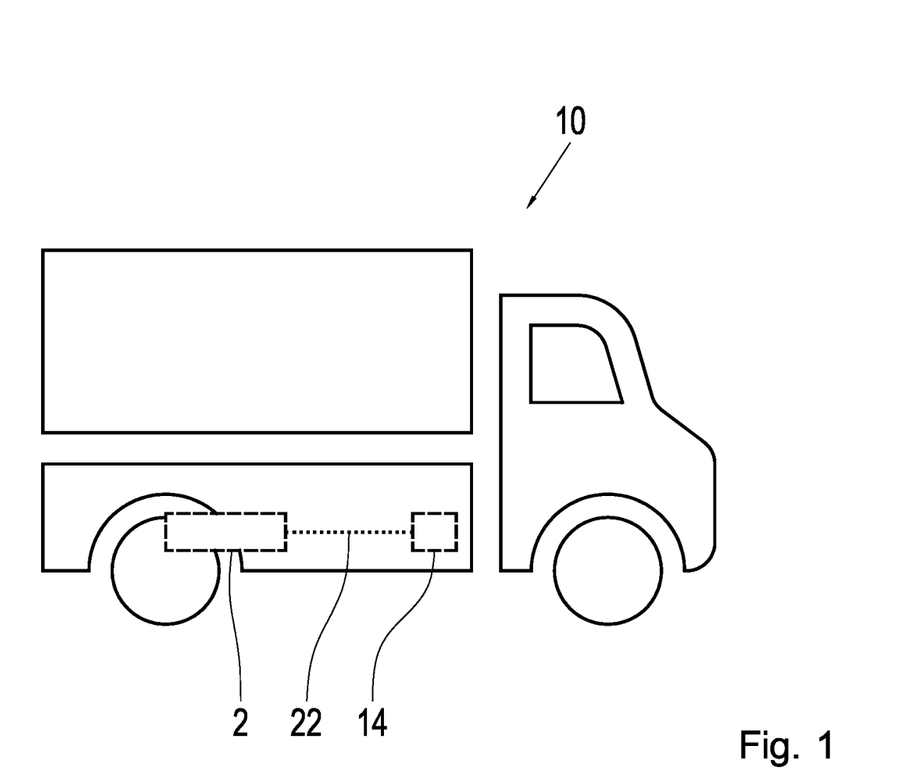
FIG. 1 a schematic depiction of a vehicle according to the invention.

FIG. 1 schematically shows a vehicle 10, particularly a utility vehicle. The vehicle 10 is formed as a land vehicle, in this case, for example, as a truck. The vehicle 10 comprises a chassis component 2, particularly a three-point link, which has a central joint device 1 (see FIG. 2). The vehicle 10 comprises a vehicle control device 14. The vehicle control device 10 is provided to control a forward movement, particularly a driving operation, of the vehicle 10 at least partially, particularly at least semiautomatically.

Figure 2:
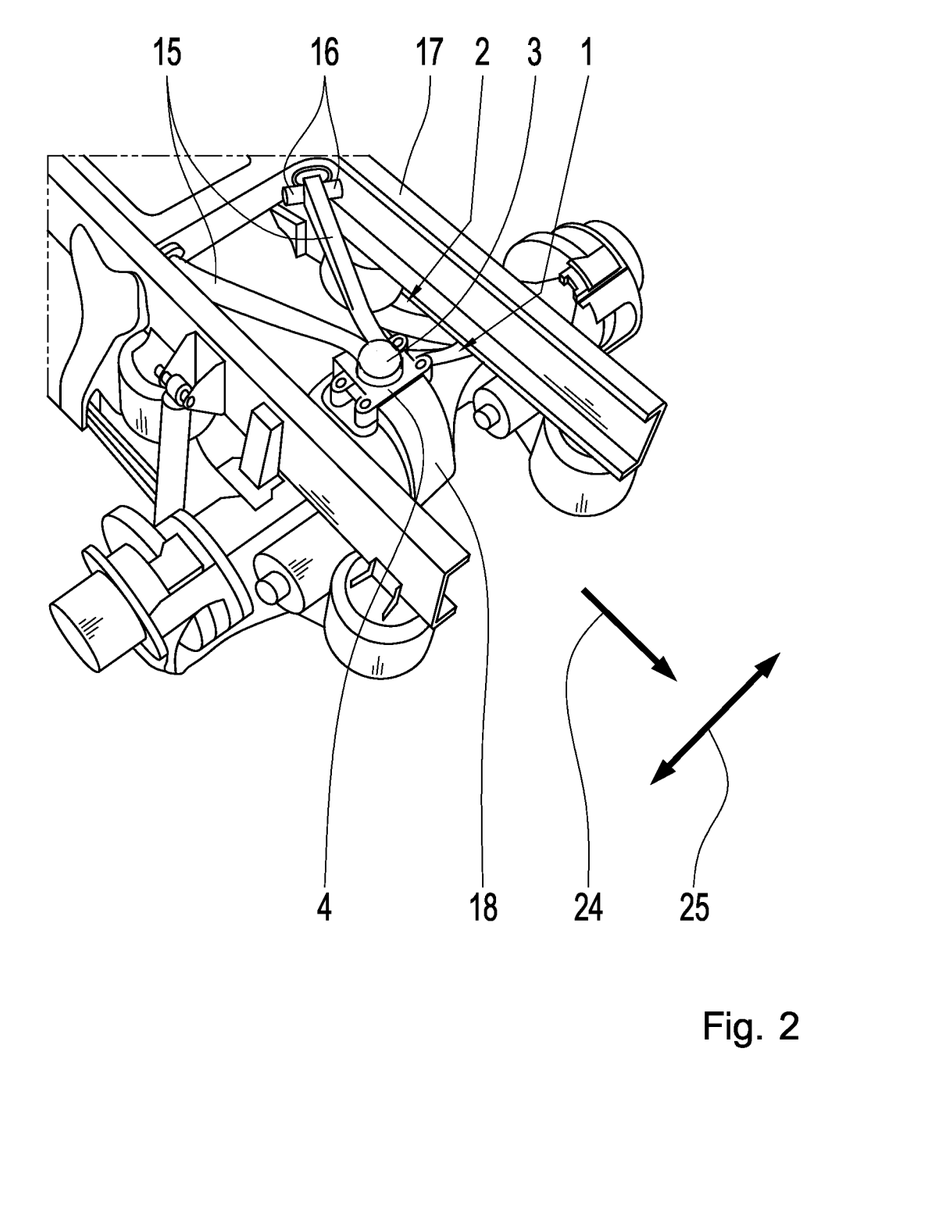
FIG. 2 a schematic perspective depiction of a chassis component, according to the invention, of the vehicle, according to the invention, from FIG. 1.

FIG. 2 shows the chassis component 2, particularly the three-point link, of the vehicle 10 from FIG. 1 in a schematic perspective view. The chassis component 2 comprises the central joint device 1. The central joint device 1 is at least partially formed as a central pivot, particularly as a ball joint. The chassis component 2 comprises further structural component parts deemed useful by a person skilled in the art such as fastening bars 15 and molecular joints 16 for fastening to a vehicle frame 17 of the vehicle 10. The central joint device 1 comprises at least one housing unit 3. The central joint device 1 comprises at least one joint pin unit 4 which is movably supported at least partially inside of the housing unit 3. The housing unit 3 is rigidly connected to the fastening bars 15 of the chassis component 2. The joint pin unit 4 is rigidly connected to a vehicle axle 18, particularly a rear axle of the vehicle 10.

Figure 3:
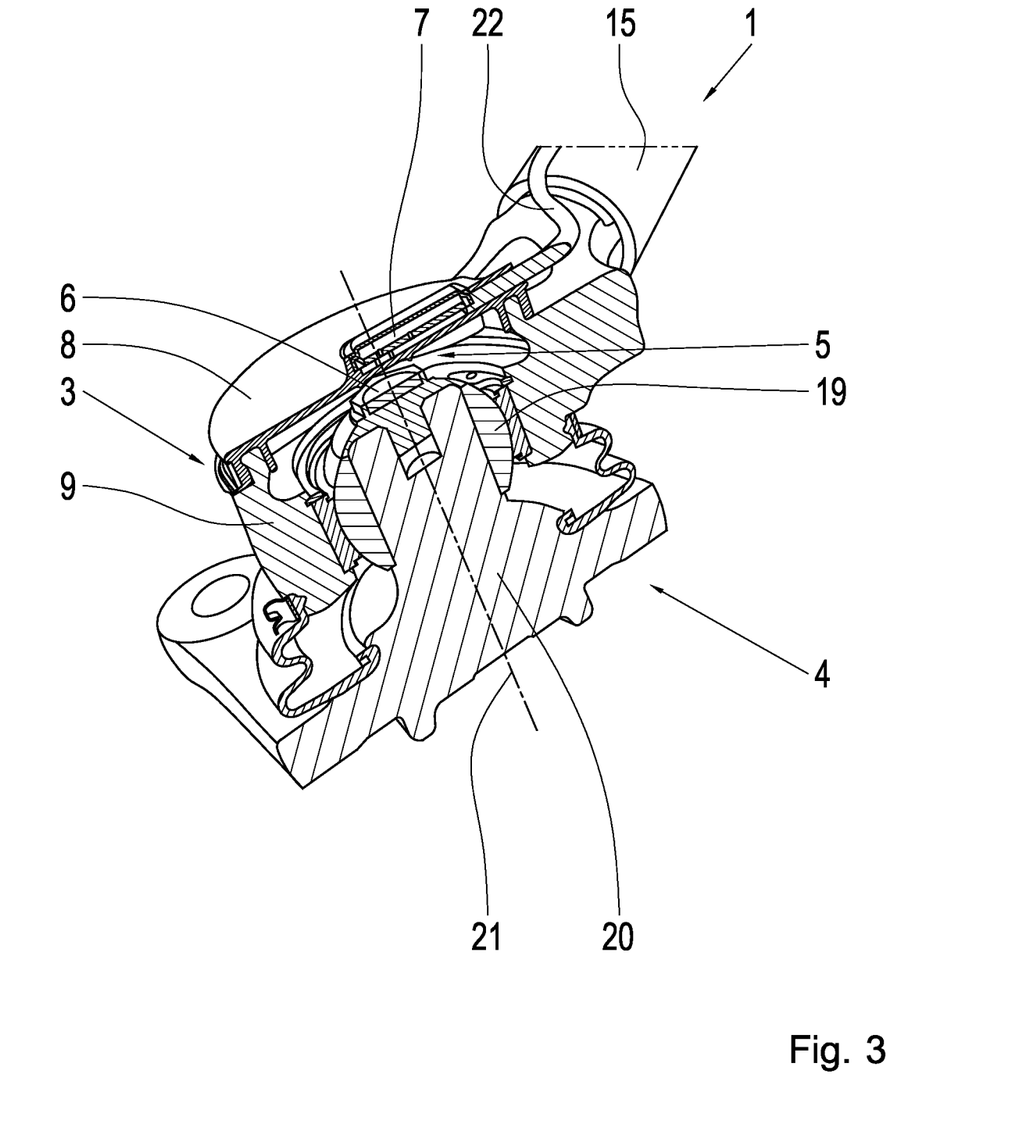
FIG. 3 a schematic perspective side view of a central joint device, according to the invention, of the chassis component, according to the invention, from FIG. 2.

FIG. 3 shows a sectional view of the central joint device 1 of the chassis component 2 from FIG. 2 in a schematic perspective view. The central joint device 1 comprises at least one sensor unit 5, particularly a magnetic sensor unit, which is provided to detect roll motions and pitch motions of the housing unit 3 and of the joint pin unit 4 relative to one another in a contactless manner. The sensor unit 5 is formed as a tilt angle sensor unit and/or rotational angle sensor unit. The sensor unit 5 comprises at least one encoder element 6. The sensor unit 5 comprises at least one sensor element 7. The encoder element 6 and the sensor element 7 are arranged at a distance from one another and so as to be movable relative to one another.

The encoder element 6 is formed as a magnet, particularly as a permanent magnet. The sensor element 7 is provided to detect a magnetic field generated by the encoder element 6. The sensor element 7 is formed as a magnetic field sensor, particularly as a Hall sensor. The sensor unit 5 is provided to detect movements, particularly roll motions and pitch motions, of the housing unit 3 and of the joint pin unit 4 relative to one another depending on magnetic field changes at the position of the sensor element 7. The sensor unit 5, particularly the sensor element 7, comprises at least one electronics, particularly an integrated circuit, in order to detect movements, particularly roll motions and pitch motions, of the housing unit 3 and of the joint pin unit 4 relative to one another depending on magnetic field changes. In an alternative embodiment, it is contemplated that the sensor unit 5 is communicatively connected to a computing device, particular, a control device, of the vehicle 10. The computing device can be provided to evaluate data acquired by the sensor element 7 (not shown here). The sensor unit 5 is provided to simultaneously detect relative movements of the housing unit 3 and joint pin unit 4 around one axes 24, 25, particularly around a longitudinal vehicle axis 24 and around a transverse vehicle axis 25. The sensor unit 5 is provided to simultaneously detect a roll motion and a pitch motion of the housing unit 3 and of the joint pin unit 4 relative to one another. Depending on a detected roll motion and/or pitch motion of the housing unit 3 and of the joint pin unit 4 relative to one another, a roll motion and/or pitch motion of the vehicle 10 can be deduced. Data provided by the sensor unit 5 can be utilized for controlling vehicle functions, for example, a ride height control, a roll stabilizer, a steering assist, or the like. The sensor unit 5 can provide the data via a line element 22, particularly a cable.

Figure 5:
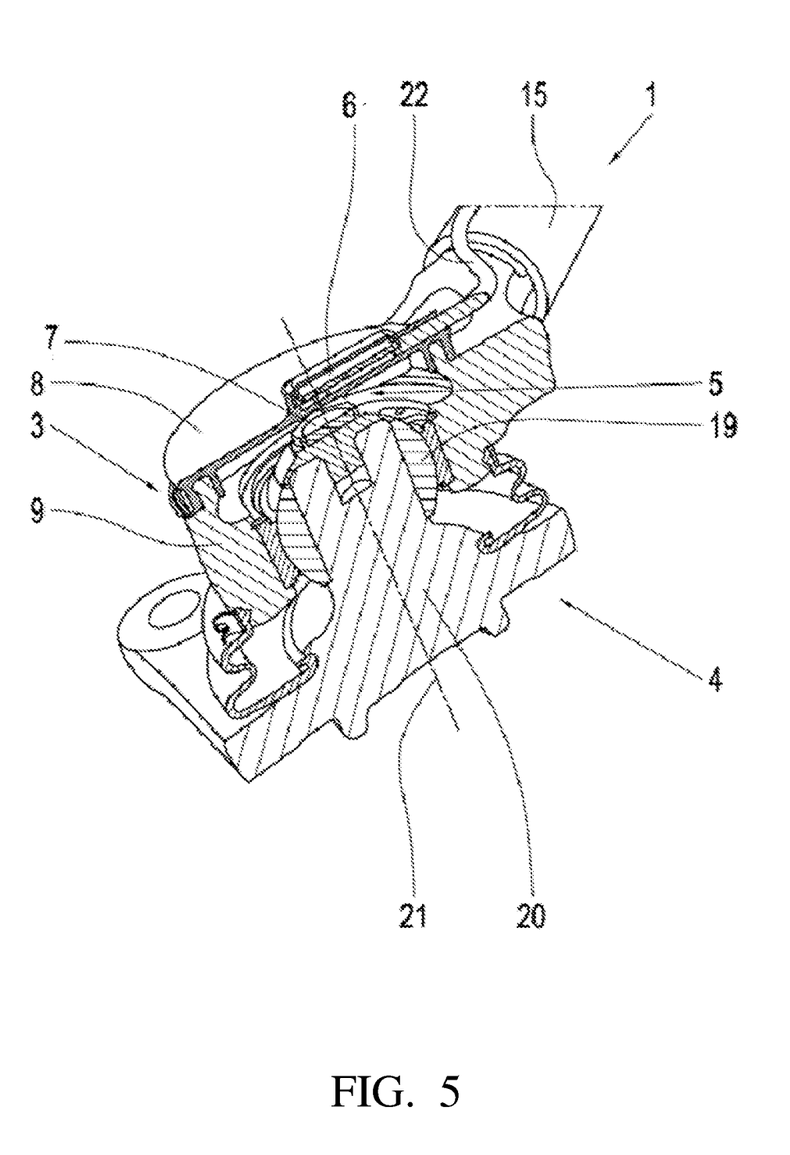
FIG. 5 is a schematic perspective side view of a central joint device, according to the invention, of the chassis component, according to the invention.

The sensor element 7 is arranged at the housing unit 3, particularly at at least one cover element 8 of the housing unit 3. The encoder element 6 is arranged at the joint pin unit 4, particularly at a joint ball 19 of the joint pin unit 4. The sensor element 7 is fixed in a stationary manner at the housing unit 3. The encoder element 6 is fixed in a stationary manner at the joint pin unit 4. The encoder element 6 is arranged in particular at least in a deflection-free position of the central joint device 1 (shown) on a side of the joint ball 6 remote of a fastening area 20 of the joint pin unit 4 for fastening to the vehicle axle 18. In the deflection-free position of the central joint device 1, a longitudinal axis 21, particularly a rotational axis, of the central joint device 1, particularly of the joint pin unit 4, extends centrally through the encoder element 6, in particular perpendicularly through a main extension plane of the encoder element 6. In an alternative embodiment form shown in FIG. 5, it is contemplated that the sensor element 7 is arranged at the joint pin unit 4, particularly at the joint ball 19, and the encoder element 6 is arranged at the housing unit 3, particularly at the cover element 8.

The sensor unit 5 is provided to detect component vibrations, particularly microvibrations, to determine wear. The sensor unit 5 is provided to detect a separation between the housing unit 3 and the joint pin unit 4 and/or between the cover element 8 of the housing unit 3 and at least one base body 9 of the housing unit 3. FIG. 3 shows the housing unit 3, the joint pin unit 4 and the cover element 8 and base body 9 in a separation-free state. The sensor unit 5 is provided to detect the separation depending on a limit distance between the encoder element 6 and the sensor element 7 being exceeded. The sensor unit 5 provides an early detection of separation depending on sensor signal harmonics, particularly angle signal harmonics.

Figure 4:
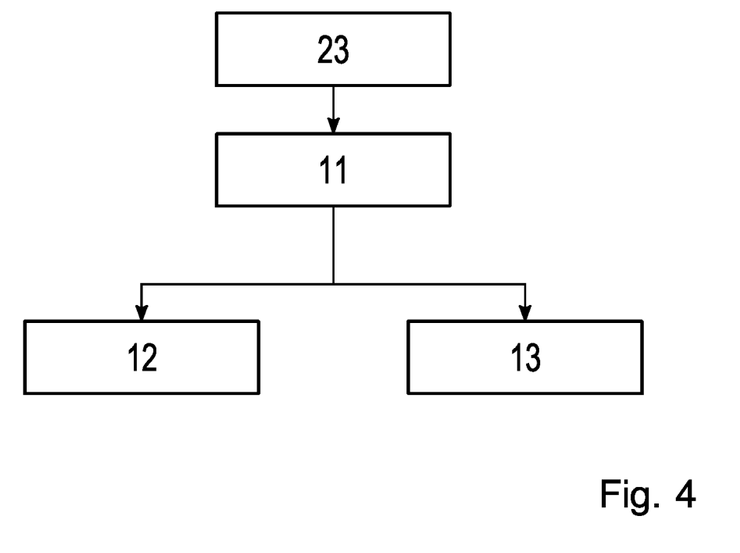
FIG. 4 is a flowchart of a computer-implemented process according to the invention, shown schematically.

FIG. 4 schematically shows a flowchart of a computer-implemented process for operating the central joint device 1.

In a first process step 23, sensor signals are generated by the sensor unit 5 depending on a detection of roll motions and pitch motions of the housing unit 3 and of the joint pin unit 4 relative to one another, depending on a detection of component vibrations or harmonics and/or depending on a detection of a separation. In a second process step 11, the sensor signals of the sensor unit 5 are evaluated to determine at least one function value of the central joint device 1, particularly a wear state and/or a separation state, and/or a vehicle state, particularly a ride height and/or a steering angle. In a third process step 12, at least one informatory signal, particularly a warning signal, is provided to at least one occupant of the vehicle, particularly a vehicle driver, depending on the evaluation of the sensor signals. In a fourth process step 13, at least one control signal or adjustment signal for the vehicle control device 14 is determined depending on the evaluation of the sensor signals. The fourth process step 13 can be carried out as an alternative to or in addition to the third process step 12.

A computer program product comprises execute commands which prompt a computing device to execute the process when the program is executed by the computing device.

The invention claimed is:

1. A central joint device for chassis components configured as a three-point link, comprising:
   at least one housing unit;
   at least one joint pin unit, which is movably supported at least partially inside of the housing unit; and
   at least one sensor unit, which is provided for contactless detection of roll motions and pitch motions of the housing unit and of the joint pin unit relative to one another,
   wherein the sensor unit comprises at least one encoder element and at least one sensor element, wherein the encoder element and the sensor element are arranged to be spaced apart from one another and movable relative to one another,
   wherein one of the sensor element and the encoder element is arranged at an external surface of at least one cover element of the housing unit.

2. The central joint device according to claim 1, wherein the sensor element is arranged at the external surface of the at least one cover element of the housing unit, and the encoder element is arranged at the joint pin unit.

3. The central joint device according to claim 1, wherein the sensor unit is formed as a tilt angle sensor unit.

4. The central joint device according to claim 1, wherein the sensor unit is provided to detect vibrations of component parts to determine wear.

5. The central joint device according to claim 1, wherein the sensor unit is provided for detecting a separation between the housing unit and the joint pin unit.

6. The central joint device according to claim 5, wherein the sensor unit is provided for detecting the separation depending on a limit distance between the encoder element and the sensor element being exceeded.

7. The central joint device according to claim 1, wherein the sensor unit is configured to provide an early detection of separation depending on sensor signal harmonics.

8. A chassis component configured as a three-point link, comprising at least one central joint device according to claim 1.

9. A utility vehicle, comprising at least one central joint device according to claim 1.

10. A computer-implemented process for operating a central joint device according to claim 1, wherein sensor signals of the sensor unit are evaluated in at least one process step for determining at least one function value of the central joint device,
    wherein the at least one function value of the central joint device is at least one of a wear state, a separation state, a ride height, a steering angle.

11. A computer-implemented process according to claim 10, wherein, in at least one process step, at least one vehicle occupant is provided with at least one informatory signal, configured as a warning signal, depending on the evaluation of the sensor signals.

12. A computer-implemented process according to claim 10, wherein at least one control signal or adjustment signal is determined for a vehicle control device in at least one process step depending on the evaluation of the sensor signals.

13. A computer program product comprising execute commands which, during the execution of the program by a computing device, cause the latter to execute a process according to claim 10.

14. The central joint device according to claim 1, wherein the sensor element is arranged at the joint pin unit and the encoder element is arranged at the housing unit at the cover element.

15. The central joint device according to claim 1, wherein the sensor unit is formed as a rotational angle sensor unit.

16. The central joint device according to claim 10, wherein the sensor unit is formed as a rotational angle sensor unit.

17. The central joint device according to claim 1, wherein the sensor unit is provided for detecting a separation between a cover element of the housing unit and at least one base body of the housing unit.

18. A utility vehicle, comprising at least one chassis component according to claim 8.

19. The central joint device according to claim 1, wherein the at least one sensor unit is a magnetic sensor unit.

* * * * *